United States Patent
Jang et al.

(10) Patent No.: US 10,116,238 B2
(45) Date of Patent: Oct. 30, 2018

(54) POWER GRID FREQUENCY FLEXIBLE OPERATION SYSTEM AND METHOD USING THE SAME

(71) Applicant: KOREA UNIVERSITY RESEARCH AND BUSINESS FOUNDATION, Seoul (KR)

(72) Inventors: Gilsoo Jang, Seoul (KR); Yunsung Cho, Seoul (KR); Jaewan Suh, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 14/794,491

(22) Filed: Jul. 8, 2015

(65) Prior Publication Data

US 2016/0036341 A1    Feb. 4, 2016

(30) Foreign Application Priority Data

Jul. 31, 2014   (KR) .................. 10-2014-0098248

(51) Int. Cl.
| | |
|---|---|
| *H02M 7/757* | (2006.01) |
| *H02M 5/44* | (2006.01) |
| *H02J 3/36* | (2006.01) |

(52) U.S. Cl.
CPC .......... *H02M 7/7575* (2013.01); *H02J 3/36* (2013.01); *H02M 5/44* (2013.01); *Y02E 60/60* (2013.01)

(58) Field of Classification Search
CPC ......... H02M 5/4585; H02M 5/458; H02J 3/36
USPC ............................................. 363/34–36, 37
See application file for complete search history.

(56) References Cited

U.S. PATENT DOCUMENTS

| | | | |
|---|---|---|---|
| 2009/0135629 A1* | 5/2009 | Mancebo del Castillo Pagola ..... | H02M 5/42 363/34 |
| 2010/0201197 A1* | 8/2010 | Shires ....................... | H02J 1/10 307/73 |
| 2012/0013285 A1* | 1/2012 | Kasunich ........... | G05B 23/0251 318/490 |
| 2012/0248874 A1* | 10/2012 | Pan ......................... | H02J 11/00 307/64 |

(Continued)

FOREIGN PATENT DOCUMENTS

| | | |
|---|---|---|
| JP | 2005039951 A | 2/2005 |
| KR | 10-0334924 B1 | 5/2002 |
| KR | 10-1034271 B1 | 5/2011 |

*Primary Examiner* — Nguyen Tran
(74) *Attorney, Agent, or Firm* — Sughrue Mion, PLLC

(57) ABSTRACT

A power grid frequency flexible operation system is provided. The system comprises a generating unit, which includes a base-load unit and a peak-load unit; a high voltage direct-current (HVDC) transmission unit, which transmits the power generated in the generating unit as direct current (DC) power; and a load, which is supplied with the power generated by the generating unit; wherein the high-voltage direct current (HVDC) transmission unit comprises a converter, which transforms to direct current (DC) power, alternating current (AC) power generated in the generating unit and having a first frequency variation allowance range; an inverter, which is connected to the converter and transforms the direct current (DC) power to alternating current (AC) power having a second frequency variation allowance range, wherein the first frequency variation allowance range is larger than the second frequency variation allowance range.

6 Claims, 4 Drawing Sheets

(56) References Cited

U.S. PATENT DOCUMENTS

2013/0234641 A1* 9/2013 Li .................... H02P 27/08
                                                    318/503
2014/0056038 A1* 2/2014 Yamamoto ........... H02M 5/297
                                                    363/36

* cited by examiner

POWER GRID FREQUENCY FLEXIBLE OPERATION SYSTEM AND METHOD USING THE SAME

CROSS-REFERENCE TO RELATED APPLICATIONS

This application claims priority under 35 U.S.C. § 119(a) to Korean Patent Application No. 10-2014-0098248 filed on Jul. 31, 2014, the disclosure of which is incorporated by reference in its entirety herein.

BACKGROUND

1. Field

The present invention generally relates to a power grid frequency flexible operation system and method using the same, and particularly, to a system and method for flexibly controlling a frequency range of electrical power supplied according to consumer characteristics.

2. Description of Related Art

To supply electricity to individual consumers, electricity generated at a power station or other electricity supplying facility is transmitted via a power grid. A power grid denotes an entire process for electricity from generation to end use. All nationally or regionally interconnected and operated power stations are connected with transmission lines, substations, distribution lines, and consumers, and 765 kV, 345 kV, 154 kV, and 66 kV flow in transmission lines, and at substations, 765 kV is converted to 345 kV, which is converted to 154 kV, which is then converted to 22.9 kV. A power grid is controlled to maintain a balance in power generation, distribution, and use. That is, operational conditions of power stations, such as electric power generator output, electric power flow in transmission lines, frequency and system voltage vary according to constantly changing demand. Also, unstable factor always exists in power grids due to external factors, such as a storm or stroke of lightning, and internal factors, such as power-grid system failure and other physical phenomenon.

On the domestic side, electricity provided to all loads in a current power grid has a frequency range of 60 Hz±0.2 Hz. Such high quality electricity is provided to all loads; however, high-quality electricity need not necessarily be supplied to all loads or, in other words, consumers. Especially, high economic cost is expended in providing high-quality electricity. Moreover, as frequencies in domestic power grids are uniformly synchronized throughout the power grids, it is impossible to supply in the form of existing power grids, frequency/frequencies of different quality within a given power grid.

SUMMARY

The present invention has been devised to solve problems such as the one above and, among others, to provide a system and method for supplying high quality electrical power having frequency with a relatively narrow allowable range to a load where high-quality electrical power is needed.

According to an embodiment of the present invention, a power grid frequency flexible operation system is a system which comprises: a generating unit, which includes a base-load source and a peak-load source; a high voltage direct-current (HVDC) transmission unit, which transmits the power generated in the generating unit as direct current (DC) power; and a load, which is supplied with the power generated by the generating unit. The high-voltage direct current (HVDC) transmission unit comprises: a converter, which transforms, to direct current (DC) power, alternating current (AC) power generated in the generating unit and having a first frequency variation allowance range; an inverter, which is connected to the converter and transforms the direct current (DC) power to alternating current (AC) power having a second frequency variation allowance range, wherein the first frequency variation allowance range is larger than the second frequency variation allowance range.

According to another aspect of the present invention, a power grid frequency flexible operation method comprises a step of supplying, to a first load, alternating current (AC) power received from a generating unit and having a first frequency variation allowance range; a step of transforming the alternating current (AC) power having the first frequency variation allowance range to alternating current (AC) power having a second frequency variation allowance range; and a step of supplying, to a second load, the alternating current (AC) power having the second frequency variation allowance range, wherein the first frequency variation allowance range is larger than the second frequency variation allowance range.

In a power-grid frequency flexible operation system and method according the embodiments of the present invention, maintenance cost for electric power reserve is saved as power demand is reduced, and management of electric power reserve is relatively facilitated.

DETAILED DESCRIPTION

Disclosed hereinafter are exemplary embodiments of the present invention. Particular structural or functional descriptions provided for the embodiments hereafter are intended merely to describe embodiments according to the concept of the present invention. The embodiments are not limited as to a particular embodiment.

The present invention maybe modified and may take on various other forms; as such, embodiments are described in detail with reference to the accompanying drawings. The embodiments are not intended to be limited to a particular form described, but include all modifications, equivalents, and substitutions, which are within the spirit and technical scope of the present invention.

Terms such as "first" and "second" may be used to describe various parts or elements, but the parts or elements should not be limited by the terms. The terms may be used to distinguish one element from another element. For instance, a first element may be designated as a second element, and vice versa, while not departing from the extent of rights according to the concepts of the present invention.

Unless otherwise clearly stated, when one element is described, for example, as being "connected" or "coupled" to another element, the elements should be construed as being directly or indirectly linked (i.e., there may be an intermediate element between the elements). Similar interpretation should apply to such relational terms as "between," "neighboring," and "adjacent to."

Terms used herein are used to describe a particular exemplary embodiment and should not be intended to limit the present invention. Unless otherwise clearly stated, a singular term denotes and includes a plurality. Terms such as "including" and "having" also should not limit the present invention to the features, numbers, steps, operations, subparts and elements, and combinations thereof, as described; others may exist, be added or modified. Existence and addition as to one or more of features, numbers, steps, etc. should not be precluded.

Unless otherwise clearly stated, all of the terms used herein, including scientific or technical terms, have meanings which are ordinarily understood by a person skilled in the art. Terms, which are found and defined in an ordinary dictionary, should be interpreted in accordance with their usage in the art. Unless otherwise clearly defined herein, the terms are not interpreted in an ideal or overly formal manner.

Hereinafter, exemplary embodiments of the present invention are described in detail with reference to the accompanying drawings.

Figure 1:
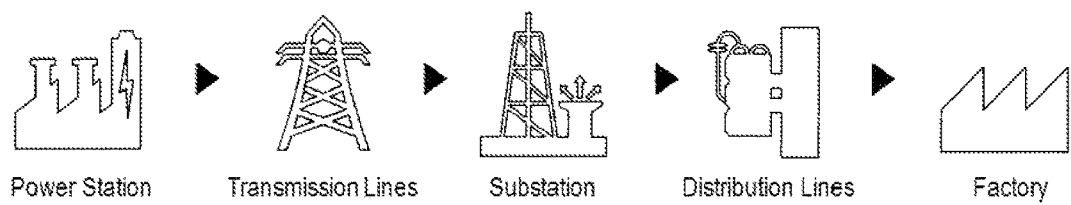
FIG. 1 shows a schematic flowchart of a general power grid/system.

FIG. 1 is a schematic flowchart of a general power grid As shown in FIG. 1, electricity or electrical power generated at a same power station moves via transmission lines to a substation and voltage is converted at a substation. Electricity, which passes through the substation, is then supplied to individual consumers, electricity users.

Such power grid is a system, wherein power generation and use are made via a plurality of power plants or stations, substations, transmission lines, and loads, which are integrated as one. Such power grid has problems as to maintaining a constant level voltage or frequency to be operated with high reliability, controlling voltage or frequency to prevent a blackout or power loss, and configuring transmission lines, etc. Excluding special cases, a power grid may not generally include another power grid with different frequency; two grids with differing frequencies have to be connected via a frequency changer or converter.

Figure 2:
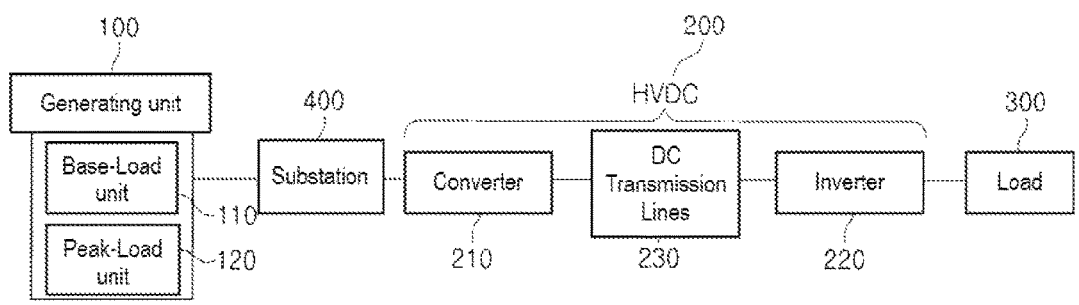
FIG. 2 shows a block diagram of a power grid frequency flexible operation system, according to an embodiment.

FIG. 2 is a block diagram of a power grid frequency flexible operation system, according to an embodiment.

According to an embodiment of the present invention, a power grid frequency flexible operation system is a system comprising a generating unit (100), which includes a base-load unit (110) and a peak-load unit (120); a high voltage direct-current (HVDC) transmission unit (200), which transmits the power generated in the generating unit (100) as direct current (DC) power; and a load (300), which is supplied with the power generated by the generating unit (100), wherein the high-voltage direct current (HVDC) transmission unit (200) comprises: a converter (210), which transforms, to direct current (DC) power, alternating current (AC) power generated in the generating unit (100) and having a first frequency variation allowance range; an inverter (220), which is connected to the converter (210) and transforms the direct current (DC) power to alternating current (AC) power having a second frequency variation allowance range. The converter (210) and the inverter (220) are connected via direct current (DC) transmission lines (230), and the first frequency variation allowance range is larger than the second frequency variation allowance range.

The generating unit (100) includes the base-load unit (110) and the peak-load unit (120). The base-load unit (110) may perform 24-hour, continuous power generation, and cost-effective nuclear and thermal power generations may be used as the base-load unit (110). In particular, in the case of nuclear power generation, as capital cost is high and operating cost is low, year-long nuclear power generation is made possible by increasing load ratio—and thus, nuclear power generation is suitable for the base-load unit. The peak-load unit (120) is a power generation, which operates when power supply is inadequate, and LNG, heavy/crude-oil, and pumped-storage hydroelectric power generations may be used as the peak-load unit (120).

That is, a load is supplied with stable power via the base-load unit (110), and variable power or demand, which is caused by load fluctuation and required by the load, is supplied via the peak-load unit (120).

Figure 3:
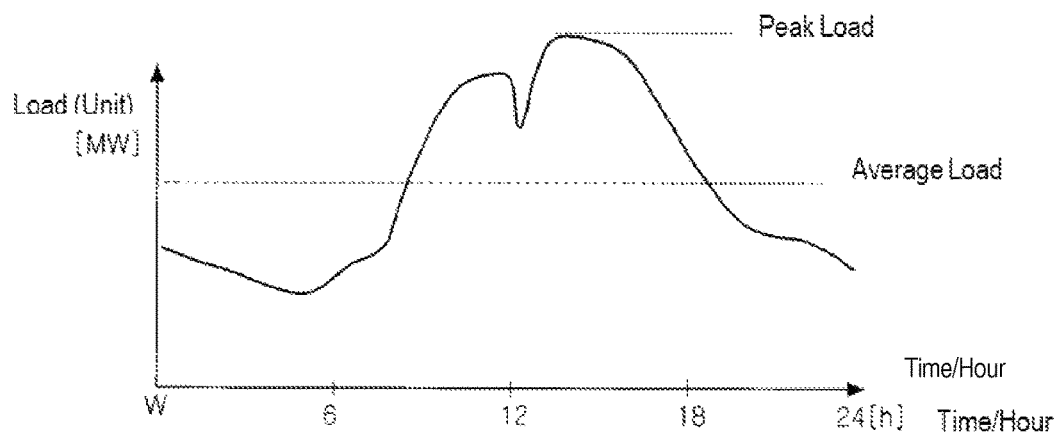
FIG. 3 shows a graph of a daily load curve.

FIG. 3 is a graph of a daily load curve.

To note, the graph in FIG. 3 shows a daily load curve for summer or warm season, taken as an example. In the load curve, it may be ascertained that difference between peak load and late-night minimum load is very large, and a spike or rapid rise in the load is expected to result from cooling or air-conditioning as the time frame during which the peak load occurs is during the day in the afternoon. Particularly, it may be ascertained that a load increase rate is steep in the hours past 9 a.m. after commuting hours.

As a matter of convenience for explanation, assuming that the average load value is power supplied by the base-load unit, power supply is made possible by operation of the base-load unit until 9 a.m. Surplus power is even produced from 12 a.m. (0 hour) to 9 a.m. Power exceeding the average load value is being used past 9 a.m. and through 7 p.m. (19 hour), and in this case, the peak-load unit is operated and supplies electric power reserve. Particularly, LNG generation has a rapid response rate, e.g., supplying 10 MW power in 10 seconds, and is thus, capable of promptly handling power supply according to pre-forecasted power demand.

In the power grid frequency flexible operation system according to an embodiment of the present invention, initiating and seizing operation of the peak-load unit (120) through such power demand or load can be forecasted.

The high-voltage direct current (HVDC) transmission unit (200) transmits power as direct current (DC) power. In case power generated in the generating unit (100) is alternating current (AC) power, the alternating current (AC) power is transformed to direct current (DC) power and the direct current (DC) power is transmitted. Then, the direct current (DC) power is transformed again to alternating current (AC) power and the alternating current (AC) power is supplied to a load.

Through direct current (DC) transmission, the high-voltage direct current (HVDC) transmission unit (200) makes effective and economic power transmission possible and overcomes disadvantages of alternating current (AC) transmission. Particularly, direct current (DC) transmission technique in the high-voltage direct current (HVDC) transmission unit (200) has economic value as it may reduce the number of base insulators and an amount of electrical loss, as well as height of metal towers or posts. Also, such transmission technique is not limited by reactance and is possible up to allowance limit or tolerance of transmission lines.

Figure 4:
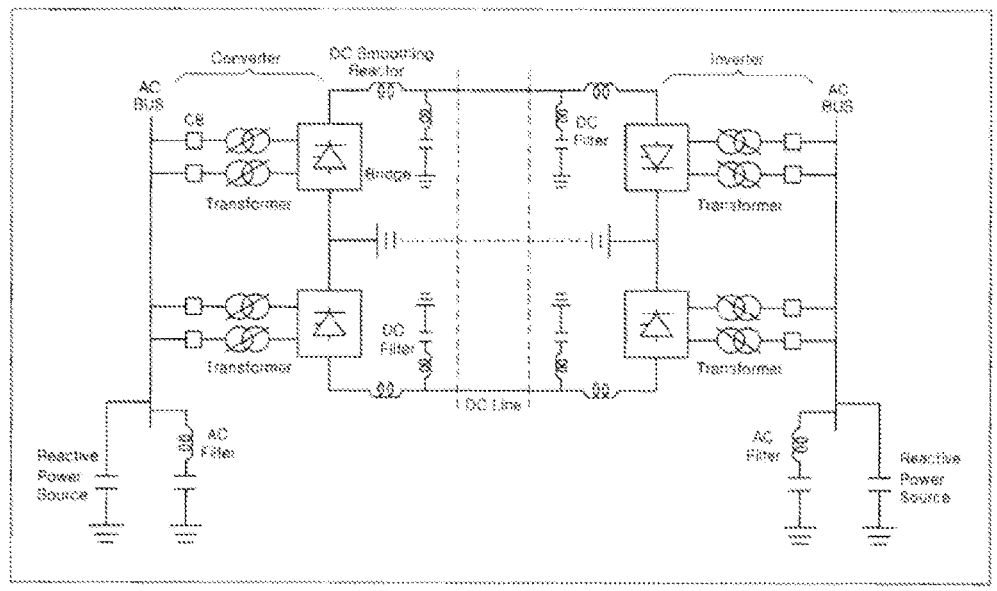
FIG. 4 shows a system arrangement plan of a bipolar high-voltage direct current (HVDC) power transmission unit.

FIG. 4 is a system arrangement plan of a bipolar high-voltage direct current (HVDC) power transmission unit.

In a power grid frequency flexible operation system according to an embodiment of the present invention, the high-voltage direct current (HVDC) transmission unit (200) comprises a converter (210), which transforms alternating current (AC) power generated in the generating unit (100) and having a first frequency variation allowance range to direct current (DC) power, and an inverter (220), which is connected to the converter (210) and transforms the direct current (DC) power to alternating current (AC) power having a second frequency variation allowance range.

The high-voltage direct current (HVDC) transmission unit (200) may be a bipolar high-voltage direct current (HVDC) transmission unit. Also, the high-voltage direct current (HVDC) transmission unit (200) may further comprise an alternating current (AC) circuit breaker (CB) and a harmonic filter (e.g., alternating current (AC) and direct current (DC) filters).

As shown in FIG. 4, the circuit breaker (CB) cuts off or shuts off power when there is a clear fault or failure in a transformer or in the high-voltage direct current (HVDC) transmission unit (200). Compared to a direct current (DC) circuit breaker, which has a large current carrying capacity, the alternating current (AC) circuit breaker (CB) is simple and effective as it cuts off the current at a zero current point.

The alternating current (AC) and the direct current (DC) harmonic filters filter harmonics occurring in both direct current (DC) side and alternating current (AC) side of the converter and inverter. Harmonics overheats generators which are close to capacitors and raises errors in communication systems.

The high-voltage direct current (HVDC) transmission unit (200) may further comprise a direct current (DC) smoothing reactor. The direct current (DC) smoothing reactor checks and restrains a rapid change in the current.

The converter (210) in the high-voltage direct current (HVDC) transmission unit (200) transforms, to direct current (DC) power, alternating current (AC) power generated in the power generating source (100) and having a first frequency variation allowance range. Taking domestic power grids, as an example, the first frequency variation allowance range maybe ±0.5 Hz on a 60 Hz standard.

The inverter (220) in the high-voltage direct current (HVDC) transmission unit (200) transforms the direct current (DC) power to alternating current (AC) power having a second frequency variation allowance range. The second frequency variation allowance range maybe ±0.2 Hz on a 60 Hz standard. Frequency variation is described in more detail, below.

Hereafter, reasons for frequency variation and advantages of enlarging frequency variation allowance range are examined and described.

Figure 5:
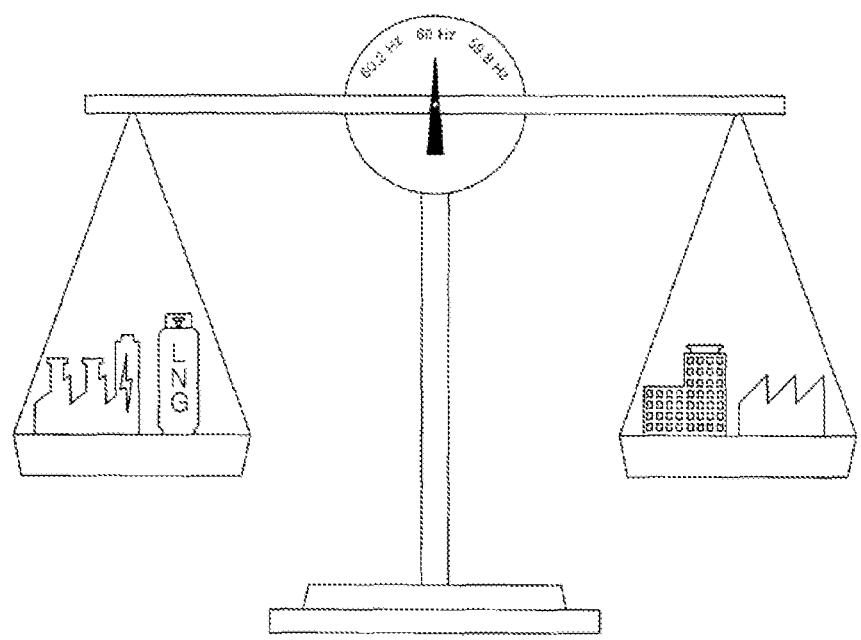
FIG. 5 shows a diagram for describing a situation in which frequency variation occurs.

FIG. 5 shows a diagram for describing a situation in which frequency variation occurs.

As shown in FIG. 5, frequency variation, which occurs in a power grid, is initiated by an imbalance in power supply and demand amounts or capacities. Peak-load unit is power generation facility aimed at resolving such supply-and-demand imbalance.

As power demand increases at the loads, frequency gradually increases, and as power supply increases, frequency gradually decreases.

Frequency variation occurring due to supply-and-demand imbalance in a power grid may negatively affect manufacturing lines at a factory. Also, where frequency variation is very large, power generating facilities may be negatively affected: e.g., vibration in steam turbine fans, performance decrease in feed water pumps, etc.

Such frequency variation is caused by load fluctuation in a power grid, and there are various cycles mixed in the load fluctuation. For stability in the frequencies, a power grid performs pre-operation, load frequency control, and economic load distribution control with respect to regular load fluctuation cycle. Also, a power grid controls generator output for frequency stability.

However, such frequency variation is known not to cause any load damage during a variation of long duration in a 0.2~0.5 Hz range. While effects of load-side electrical devices, such as electrical clock, motor, automatic instrument, etc., which are affected by frequency variation, may be thought about in considering a frequency variation range, in a research by Switzerland Institute/Society of Electrical Engineering, it is confirmed that frequency variation in a 0.2~0.5 Hz range is not problematic.

As shown in FIG. 5, a frequency range in domestic power grids is 60 Hz±0.2 Hz. Particularly, transactions as to electrical power only in 60 Hz±0.1 Hz range are made at Power Exchange.

In case a frequency allowance range is narrow like this, LNG generation, which was taken as an example of peak-load unit has to respond more rapidly and sensitively to a power-demand forecast. This peak-load unit response may pose a burden on the peak-load unit, and as required electric power reserve is increased, cost for generating electric power is also increased.

In this regard, the power grid frequency flexible operation system, according to an embodiment of the present invention, maintains a first frequency variation allowance range, which is a frequency variation allowance range of alternating current (AC) power inputted into the high-voltage direct current (HVDC) transmission unit (200), at 60 Hz±0.5 Hz—a range larger than the domestic power grid frequency range of 60 Hz+0.2 Hz—and thereby, prevents excessive cost from being incurred in frequency maintenance.

Also, reliable and high quality alternating current (AC) power may be usable at a load, which requires high-quality power, by transforming to alternating current (AC) power having a second frequency variation allowance range at the inverter (220). In case of being applied to domestic power grids, the second frequency variation allowance range may be 60 Hz±0.2 Hz.

Figure 6:
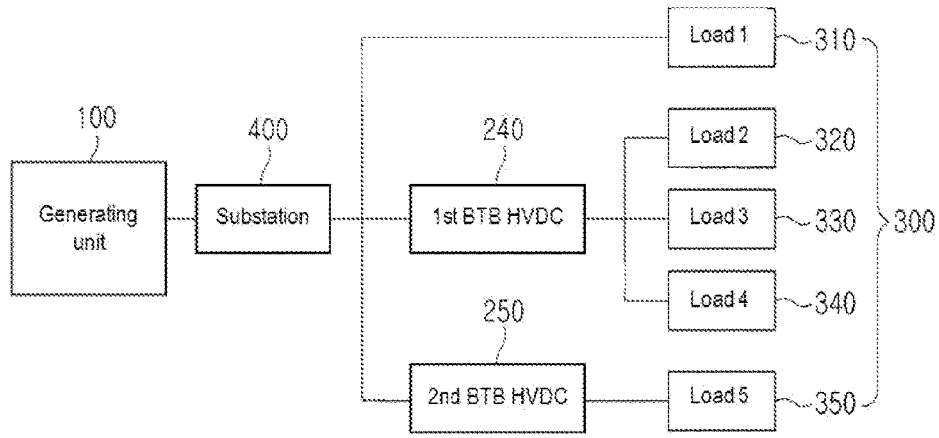
FIG. 6 shows a block diagram of a power grid frequency flexible operation system, according to another embodiment.

FIG. 6 is a block diagram of a power grid frequency flexible operation system, according to an embodiment.

As shown in FIG. 6, in a power grid frequency flexible operation system, according to an embodiment of the present invention, the generating unit (100) and loads (300) are connected via a high-voltage direct current (HVDC) transmission unit.

Particularly, the high-voltage direct current (HVDC) transmission unit may be a back-to-back high-voltage direct current (BTB HVDC) transmission unit.

Generally, a high-voltage direct current (HVDC) transmission unit is categorized as a current-type HVDC unit using a thyristor valve and a voltage-type HVDC unit using an insulated gate bipolar transistor (IGBT). In BTB HVDC, which is one type of current-type HVDC, a concept of negative voltage does not exist, and as there are not any transmission lines, resistance loss the transmission lines need not be considered.

A first back-to-back high-voltage direct current (BTB HVDC) transmission unit (240) and a second back-to-back high-voltage direct current (BTB HVDC) transmission unit (250), shown in FIG. 6, are assumed to have a 500 MW capacity.

Frequency of power supplied by the generating unit (100) may have a first frequency variation allowance range. Also frequency of power, which passes through the first BTB HVDC (240) and the second BTB HVDC (250) transmission units, may have a second frequency variation allowance range. The first frequency variation allowance range is larger than the second frequency variation allowance range.

Power used in each load is determined by a contract, and whether or not high-quality power is to be used is also predetermined for each load.

In the case of load 1 (310), the load 1 (310) is supplied with alternating current (AC) power as is, as in existing power grids. Power supplied to the load 1 (310) is power having the first frequency variation allowance range. In the case of load 2 (320), load 3 (330), and load 4 (340), power generated by the generating unit (100) is transformed to direct current (DC) power at an input portion of the first BTB HVDC transmission unit (240) and is transformed to alternating current (AC) power having the second frequency variation allowance range at an output portion of the first BTB HVDC transmission unit (240), before being transmitted to the loads 2 (320), 3 (330), and 4 (340). Even when a sum of power required at the loads 2 (320), 3 (330), and 4 (340) does not exceed 500 MW, high-quality power having the second frequency variation allowance range is supplied to the loads 2 (320), 3 (330), and 4 (340), by installing the first BTB HVDC transmission unit (240), which is a high-voltage direct current transmission unit, at a second side of the substation (400).

In the case of load 5 (350), which is a case of a consumer requiring high-quality power, high-quality power having the second frequency variation allowance range is supplied to the load 5 (350), by installing the second BTB HVDC transmission unit (250) at a front side of the load 5 (350).

As described, by distinguishing loads, which are supplied with high-quality power, cost incurred in supplying high-quality power is shifted to loads which require the high-quality power, and not on all power loads. That is, cost, which had to be shared by all users, may now be borne only by those users who require high-quality power, and a pragmatic solution to such problem is provided.

Heretofore, a power grid frequency flexible operation system has been described according to an embodiment of the present invention.

Hereinafter, a power grid frequency flexible operation method is described, as another aspect of the present invention. Redundant descriptions as to parts or elements, which have already been made in the foregoing embodiments, are omitted.

Figure 7:
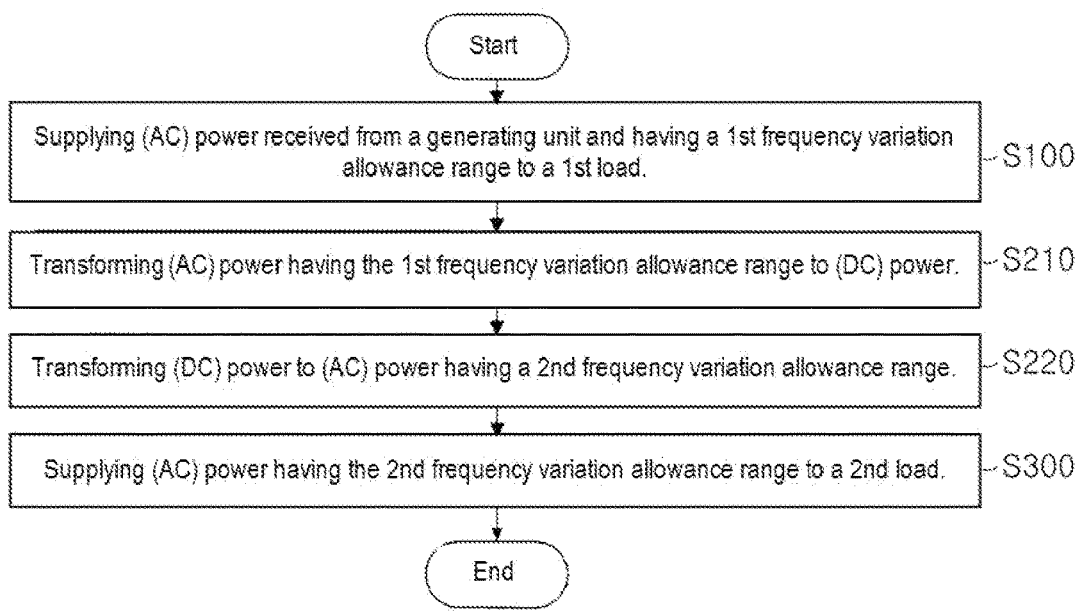
FIG. 7 shows a flowchart of a power grid frequency flexible operation method, according to an embodiment.

FIG. 7 is a flowchart of a power grid frequency flexible operation method, according to an embodiment.

As shown in FIG. 7, a power grid frequency flexible operation method, according to an embodiment of the present invention, comprises: a step (S100) of supplying alternating current (AC) power received from a generating unit and having a first frequency variation allowance range to a first load; a step of transforming the alternating current (AC) power having the first frequency variation allowance range to alternating current (AC) power having a second frequency variation allowance range; and a step (S300) of supplying the alternating current (AC) power having the second frequency variation allowance range to a second load.

Here, the first frequency variation allowance range is larger than the second frequency variation allowance range.

Also, the step of transforming the alternating current (AC) power having the first frequency variation allowance range to the alternating current (AC) power having the second frequency variation allowance range comprises: a step (S210) of transforming (AC) power having the first frequency variation allowance range to direct current (DC) power via a high-voltage direct current (HVDC) transmission unit; and a step (S220) of transforming the direct current (DC) power to the alternating current (AC) power having the second frequency variation allowance range.

Examining the power grid frequency flexible operation method using a domestic power grid as an example, electrical power generated at a power plant and having a first frequency variation allowance range (60 Hz±0.5 Hz) is supplied to a first load, which does not require high-quality power. To transform the alternating current (AC) power generated at the power plant and having the first frequency variation allowance range to that having a second frequency variation allowance range (60 Hz±0.2 Hz), the former is transformed to direct current (DC) power via a high-voltage direct current (HVDC) transmission unit, and the direct current (DC) power is again transformed to alternating current (AC) power having the second frequency variation allowance range and then supplied to a second load.

A power grid need not be operated by a power grid frequency flexible operation method, according an embodiment of the present invention, in order to provide all loads with high-quality power across the board. High-quality power may be provided by connecting high-voltage direct current (HVDC) transmission unit to a grid, which is connected to a load requiring high-quality power.

The invention claimed is:

1. A power grid frequency flexible operation system, comprising:
   a generating unit which includes a base-load unit and a peak-load unit and generates first alternating current (AC) power;
   a high-voltage direct current (HVDC) transmission unit which receives the first alternating current (AC) power generated by the generating unit and transmits second alternating current (AC) power;
   a first load; and
   a second load,
   wherein the high-voltage direct current (HVDC) transmission unit comprises:
   a converter which transforms the first alternating current (AC) power generated by the generating unit to direct current (DC) power;
   an inverter which is connected to the converter and transforms the direct current (DC) power to the second alternating current (AC) power,
   wherein a frequency of the first alternating current (AC) power has a first frequency variation allowance range,
   wherein a frequency of the second alternating current (AC) power has a second frequency variation allowance range,
   wherein the first frequency variation allowance range of the frequency of the first alternating current (AC) power generated by the generating unit is larger than the second frequency variation allowance range of the frequency of the second alternating current (AC) power,
   wherein the second load requires a power having a higher quality than a quality of a power required by the first load,
   wherein the first load is supplied with the first alternating current (AC) power having the first frequency variation allowance range larger than the second frequency variation allowance range, wherein the second load is supplied with the second alternating current (AC) power having the second frequency variation allowance range, and wherein the first frequency variation allowance range of the first alternating current (AC) power is from −0.5 Hz to +0.5 Hz on a 60 Hz standard, and the second frequency variation allowance range of the second alternating current (AC) power is from −0.2 Hz to +0.2 Hz on the 60 Hz standard.

2. The power grid frequency flexible operation system according to claim 1, wherein an output of the inverter supplies the second alternating current (AC) power by connecting with the second load.

3. The power grid frequency flexible operation system according to claim 1, wherein the high-voltage direct current (HVDC) transmission unit is a bipolar HVDC transmission unit.

4. The power grid frequency flexible operation system according to claim 3, wherein the high-voltage direct current (HVDC) transmission unit further comprises a circuit breaker.

5. The power grid frequency flexible operation system according to claim 4, wherein the high-voltage direct current (HVDC) transmission unit further comprises a harmonic filter.

6. A power grid frequency flexible operation method comprising:

supplying, to a first load, first alternating current (AC) power generated by a generating unit, wherein a frequency of the first alternating current (AC) power generated by the generating unit has a first frequency variation allowance range;

transforming the first alternating current (AC) power having the first frequency variation allowance range and generated by the generating unit to second alternating current (AC) power, wherein a frequency of the second alternating current (AC) power has a second frequency variation allowance range, and the transforming comprises transforming the first alternating current (AC) power having the first frequency variation allowance range to direct current (DC) power and transforming the direct current (DC) power to the second alternating current (AC) power having the second frequency variation allowance range; and supplying, to a second load, the second alternating current (AC) power having the second frequency variation allowance range, wherein the first frequency variation allowance range of the frequency of the first alternating current (AC) power generated by the generating unit is larger than the second frequency variation allowance range of the frequency of the second alternating current (AC) power supplied to the second load, wherein the second load requires a power having a higher quality than a quality of a power required by the first load, and wherein the first frequency variation allowance range of the first alternating current (AC) power is from −0.5 Hz to +0.5 Hz on a 60 Hz standard, and the second frequency variation allowance range of the second alternating current (AC) power is from −0.2 Hz to +0.2 Hz on the 60 Hz standard.

* * * * *